United States Patent [19]

Barbera

[11] Patent Number: 4,867,027

[45] Date of Patent: Sep. 19, 1989

[54] RESONANT PICK-UP SYSTEM

[76] Inventor: Richard Barbera, 6725 13th Ave., Brooklyn, N.Y. 11219

[21] Appl. No.: 84,383

[22] Filed: Aug. 11, 1987

[51] Int. Cl.⁴ ................................................ G01H 3/00

[52] U.S. Cl. ................................ 84/731; 84/DIG. 24

[58] Field of Search ............... 84/DIG. 24, 1.14, 1.16; 381/114, 173; 310/328, 334, 339

[56] References Cited

U.S. PATENT DOCUMENTS

| | | | |
|---|---|---|---|
| 3,291,887 | 12/1966 | Carman et al. | 84/DIG. 24 |
| 3,325,580 | 6/1967 | Barcus et al. | 84/1.14 |
| 3,712,951 | 1/1973 | Rickard | 84/DIG. 24 |
| 4,292,875 | 10/1981 | Nourney | 84/1.14 |
| 4,785,704 | 11/1988 | Fishman | 84/1.16 |

*Primary Examiner*—A. T. Grimley
*Assistant Examiner*—Matthew S. Smith
*Attorney, Agent, or Firm*—Bauer & Schaffer

[57] ABSTRACT

A pick-up system for a stringed instrument in the form of a bridge structure, supporting a cartridge assembly having one or more of a plurality of independently vibrating segments, across each of which a corresponding string is tensioned. Each assembly contains an individual piezo element mounted in suspension in a clearance cavity, in alignment with and responsive to the vibrations of a corresponding string.

17 Claims, 2 Drawing Sheets

RESONANT PICK-UP SYSTEM

BACKGROUND OF THE INVENTION

The present invention relates to a resonant pick-up system for a stringed instrument and in particular, to a composite piezo-electric transducer bridge assembly for violins and similar string instruments.

Piezo-electric amplification of the sound produced by vibrating strings has become common, especially as adapted to guitar and hand plucking type instruments, as will be seen from the following patents: 2,222,057; 3,113,990; 3,178,501; 3,291,887; 3,325,580; 3,453,920; 3,712,951; 4,147,084; 4,314,495; 4,356,754; 4,491,051; 4,567,805.

A common approach is to compressively engage a piezo element, (or elements) between the saddle, which supports the strings, and the saddle mounting structure which lies on the instrument top. This is essentially a contact microphone arrangement directly beneath the strings and the piezo element is responsive, in common, to all the strings. The response of the piezo element being determined by a vibrational response of the materials it is sandwiched between. While this generally produces the desired result, there are some problems with this approach. One major problem being a susceptibility to an electro-harmonic feedback loop occurring through the amplification system due to the instrument body acting as a large microphonic surface. The electrical output of the piezo elements are also limited due to the compressive restraints on the elements. Also, an unbalanced output from string to string due to varying string size-amplitude relationships.

The application of piezo-electric elements to violins or similar instruments, such as the cello and bass require a different approach than that of the guitar. A violin bridge with its thin, high structure, supported by two small feet and balanced on the instrument top by the pressure of the tightened strings seated upon it, does not lend itself to an effective compressive mounting of piezo elements near the strings. While a guitar, with its short saddle structure close to the top of the instrument, easily accommodates the placement of piezo elements under the saddle in close proximity to the strings, orientated on a flat surface parallel with the plane of the instrument body's top surface. The violin requires a different orientation of the transducer elements to retain the proportions of bridge to body size. As already stated, the bridge structure is very thin and high above the instrument body. This limits the arrangement wherein a single piezo element or even multiple elements can interact with any given vibrating string with sufficient isolation from the violin body, and from the other strings, to produce a clear strong signal.

An object of the invention is to provide an acoustically coupled transducer system with excellent inherent harmonic qualities which is capable of transforming the dissimilar vibratory motions of bowed or plucked strings into electrical signals.

It is a further object of the invention to provide an acoustically coupled pick-up system capable of producing a flat, uniform response, while minimizing unwanted resonances and instrument body noise.

The purpose of this invention is to provide an efficient electro-mechanical coupling between each musical instrument string and an associated piezo-electric transducer element, in a multiple stringed instrument.

This produces a high fidelity audio signal for amplification, equally from all the strings.

The above and other objectives, features and advantages of the present invention will be more readily understood upon consideration of the following disclosure.

SUMMARY OF THE INVENTION

According to the present invention, a pick-up system for a stringed musical instrument is provided in the form of a bridge supporting a plurality of independent flexurally responsive vibrating segments across which a corresponding string is tensioned. Each segment contains an individual piezo element suspended in a mounting within a clearance cavity to enable the unimpeded vibration of such element.

Depending on the application, the segments may be assembled as an integral part of a multi-sectioned unitary cartridge supported as a whole in a base body, or be provided as a plurality of independent cartridges, which are combined separately in a base body. In either case, the cartridge and/or supporting body structure is provided with slots and openings which enable the vibrational response of each segment, and to avoid interference with the supporting body structure or the other cartridges segments.

In each case, the principle of function is the same, with each segment flexing independently in response to a corresponding string through the free standing cartridge portion which supports the string. Each flexural segment has mechanical clearance the full length of the flexing portion, and from the supporting body and adjacent segments to provide for maximum unimpeded lateral vibration.

Full details of the present invention are set forth in the following description of the embodiments illustrated in the accompanying drawings.

DESCRIPTION OF THE INVENTION

Figure 1:
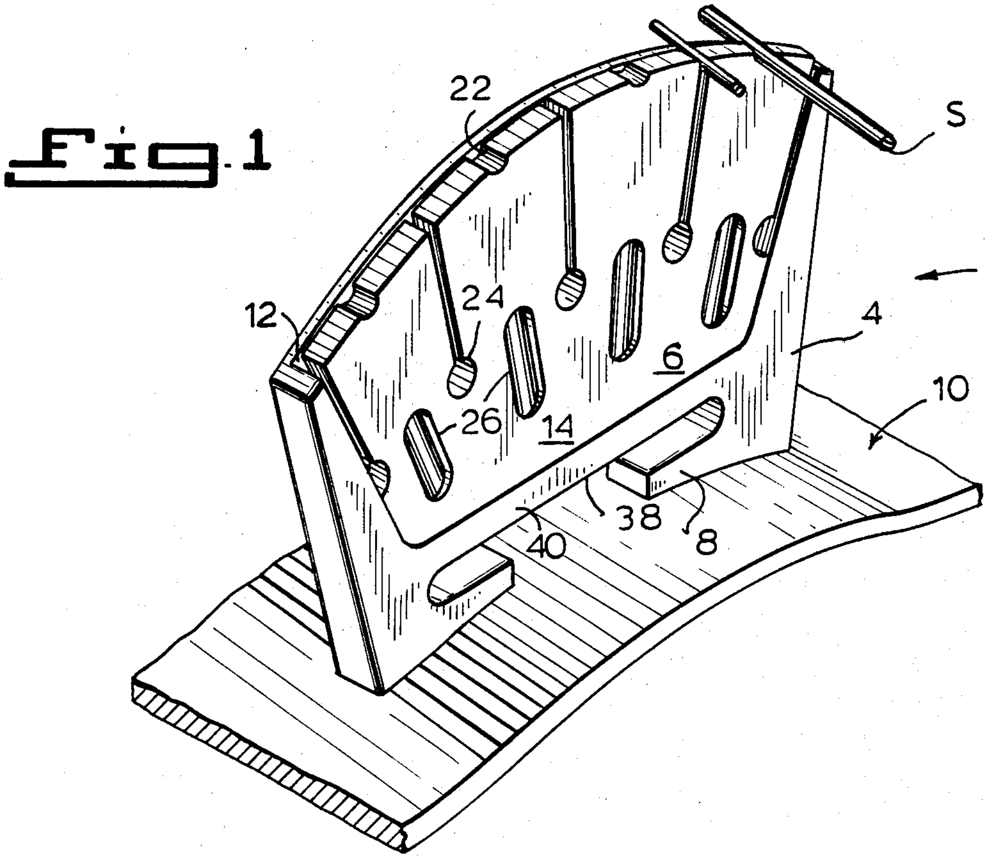
FIG. 1 is a perspective view of a violin bridge transducer assembly embodying the present invention.
Figure 2:
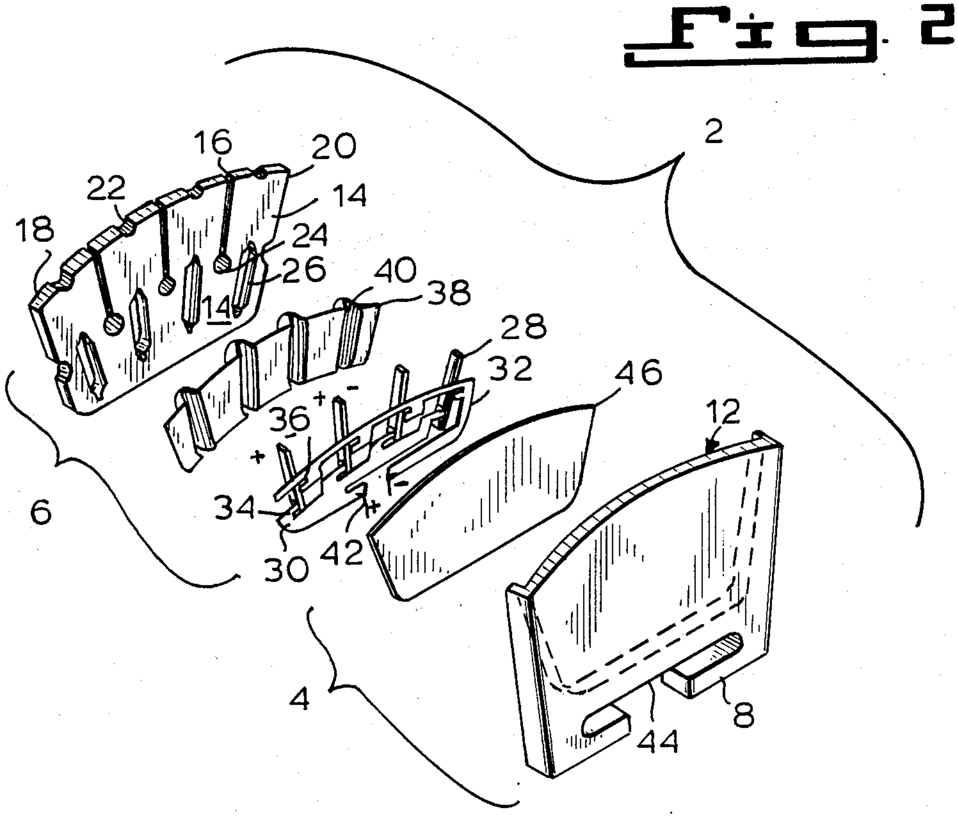
FIG. 2 is an exploded view of the assembly shown in FIG. 1.

In FIGS. 1 and 2, the pick-up system of the present invention is shown as applied to a violin and is generally identified by the numeral 2. The device 2 comprises two basic elements namely, a supporting bridge member, identified by the numeral 4, and a vibrationally responsive transducer cartridge assembly, generally identified by the numeral 6.

The supporting bridge member 4, is of conventional violin bridge material such as hard wood. However, any material possessing the necessary tensile strength and harmonic qualities may be employed. The bridge member 4, has standard shaped feet 8 so that it may be mounted on a traditional instrument 10 in a conventional manner. In addition, the bridge member 4 is provided with a recess forming a conforming nest 12 into which the piezo-electric cartridge assembly 6 is seated.

The transducer cartridge assembly 6 comprises a body 14, also of wood or other suitable material as noted above and is fabricated into a configuration which facilitates the lateral compliance of flexurally responsive segments to excitation upon bowing or plucking one or more of the corresponding strings shown schematically by the letter S.

The cartridge body 14 is provided with a plurality of slots 16 extending downwardly or inwardly from its crown or upper edge 18 so as to divide the body 14 into a plurality of separate outwardly extending vibrating string supporting crown sections or segments 20. The cartridge body 14 is set within the nest 12 so that the upper portion or crown 18 extends above the corresponding edge of the supporting bridge member 4. The strings S are supported in shallow receiving grooves 22 or other means formed in the upper edge 18 of each segment 20 and the slots 16 terminate in a rounded flex enhancing hole 24 below which each segment 20 is joined within the base portion or non-vibrating segment of the cartridge body 14. Each vibrational crown segment 20 of the cartridge body 14 is provided with a respective oblong radially directed cavity 26, the longitudinal axis of which may be aligned with the string receiving grooves 22 of its respective segment.

Mounted within each of the cavities 26, is a vibrationally responsive transducer 28. While any conventional transducer may be used, it is preferred that a bimorph piezo-electric element 28 be used. The piezo elements 28 are mounted cantilevered fashion from each of its ends within the respective cavities 26 having their ends adhered or otherwise fixed in the cavity walls. Thus, the piezo-elements are mounted along the longitudinal axis of its respective cavity so that one end is fixed to the vibrating portion of section 20 and the other end is fixed to the lower non-vibrating stationery base portion of 504 the cartridge body 14 below the hole opening 24. In this way, the flexural excitation produced by the the individual string S directly above the cavity 26 is transferred directly to the piezo element 28, without mechanical impedence along its length.

Each of the bimorph piezo elements 28 is made from a lamination of at least two polarized piezo-electric materials the relative vibrations of which are transduced into a flow of electric current. The corresponding opposite sides of each of the piezo elements 28 are shown connected in parallel to a pair of contact plates 30 and 32, each formed with finger-like extensions 34 and 36, which engage the respective sides of each of the piezo elements 28 with a minimum of mechanical impedance. However, other circuit configurations can be utilized such as isolating each of the piezo element's output through its own pre-amp channel, and the resultant, signals mixed together at the outputs of the preamps.

The entire sub-assembly of piezo elements 28, and flexible contact plates 30 and 32, are generally sealed within a insulative coating or lamination which prevents short-circuiting of the piezo elements with the other members of the cartridge assembly 6.

A unitizing grounded shielding plate 38 covers the front face of the piezo elements 28 prior to their mounting within the cavities 26. The shielding plate 38 is preferably made from a single strip of copper formed to provide capsule like projections 40 into which respective piezo elements 28 fit. In using the copper shield plate, the projections 40 are fit within the cavities 26 and held in place by their spring-like form or by a suitable adhesive. Each of the plates provides Electro magnetic interference shielding and a protective closure for each of the piezo elements 28. Alternatively, the piezo elements may be encapsulated in a conductive coating which is connected to ground to obtain the desired reduction in interference and noise. The current plates 30 and 32 would also be included in the encapsulation.

The piezo elements 28 are electrically connected to a conventional amplifier (not shown) by way of lead wires 42 which preferably pass through a hole 44 in the lower portion of the supporting bridge member 4.

The cartridge assembly 6 is assembled within the nest 12, formed in the supporting bridge 4. The nest 12, conforms in shape and general thickness to that of the cartridge body 14. Interposed between the cartridge body 14, and piezo elements 28 and the back wall of the nest 12 in the supporting bridge 4, is a grounded flat copper shim plate 46 having a height approximately equal to half the height of the cartridge body 14, thereby extending no higher than approximately the level of the openings 24 at the end of slits 16 in the body 14. In this manner, the copper shim plate 46 provides clearance between the body 14 and the facing wall of the nest 12 to maintain the vibrating portions of sections 20 of the cartridge separated from the side and back walls of the nest 12 so that they will freely vibrate. The copper shim plate 46 also provides electro-magnetic interference (EMI) shielding for the back of the piezo elements 28 from which it is insulated by a dielectric lamination or coating sealing the contact plates 30 and 32. The shim plate 46 is connectred to ground in the circuit and laminated by a suitable adhesive to the back wall of the nest 12 and to the cartridge body 14, thereby unitizing the entire structure.

It is also within the contemplation of the invention, to provide the nest 12 with a suitable ledge or other means that will space the cartridge body 14 from the facing wall of the next 12 to allow free vibration without the use of a separate shim. The shielding may be provided by a back cover integral with the cartridge body.

In the arrangement thus described, the separate segments 20 of the cartridge body 14 are permitted to vibrate in response to the vibrating movement of strings S tensioned across each segment. The vibration of each segment 20 exciting its associated piezo element 28.

Figure 3:
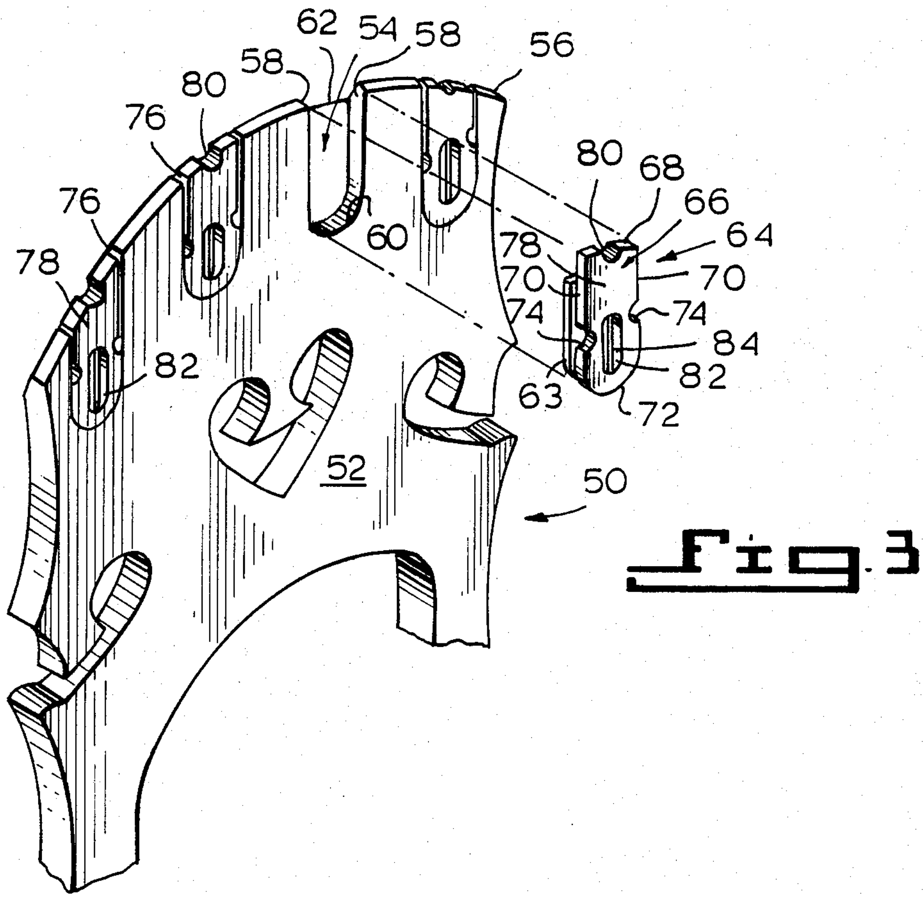
FIG. 3 is a perspective view of a second embodiment of the present invention.

In FIG. 3, the present invention is shown adapted to a larger string instrument such as a cello or bass. Here, the transducer bridge assembly generally depicted by the numeral 50, consists of a cartridge base support 52 in the form of a wood bass bridge, which may be tapered and shaped as desired. The base support 52 is provided with standard shaped feet (not shown) to be mounted on a traditional instrument in a conventional manner.

The base support 52 is provided with a plurality of U-shaped recesses 54 extending vertically downward from the upper edge 56. Each of the recesses 54, defined by opposing parallel side walls 58 and a rounded connecting lower web 60, is enclosed at its rear by an integral back wall 62 . A copper shield insert plate 63 is placed between the back wall 62 and a piezo-electric cartridge 64 in the manner of and for the purpose previously described. The back wall 62 terminates, well below the top edge 56 to allow free movement of the string. Nested within each recess 54, is a single piezo-element cartridge assembly 64. If desired, the recess 54 may be provided with a shim or an integral ledge and the copper shield incorporated in the cartridge assembly also as indicated previously.

The cartridge assembly 64 comprises a body 66 of a shape similar to the channel 54 having an upper edge 68, opposed parallel side walls 70, a rounded bottom wall 72, and a flex enhancing opening in the form of a notch 74 formed in each of its side walls 70. The rounded bottom wall 72 conforms in shape to the connecting web 60 of the recess 54 in which it is located so that it will seat firmly and stabily therein. The opposing side walls 70 of each cartridge 64 are spaced from each other, a distance less than the distance between the walls 58 of the U-shaped recess 54, so that between the paired side walls 70 and walls 58, a narrow slot 76 is provided. Preferably, the cartridge 64 is secured by adhering the lower portion of the cartridge body 66 to the channel with suitable glue or adhesive material along the interface of the connecting web 60 and rounded edge wall 72, as well as between the back wall 62 and rear face of the cartridge body 66, and/or shield plate 63 well below the semi-circular notches 74. In this manner, each cartridge assembly 64 provides a singular flexible upper portion 78 above the notches 74 which will vibrate freely with respect to the mass of the bridge 52 and be free of interaction or interference with any of the other cartridges.

A groove or other means 80 can be formed in the upper edge 68 of each cartridge body 66 in which is seated the respective string. An oblong cavity 82 is provided in the area below the notch 74 and a piezo element assembly including shielding plate and electric leads, all as described more fully in connection with the embodiment of FIGS. 1 and 3, is located therein. The piezo element assemblies generally depicted by the numeral 84, are electrically connected separately by leads to an amplifier (not shown), or they may be connected by a ganged connecting lead, to the amplifier.

Figure 4:
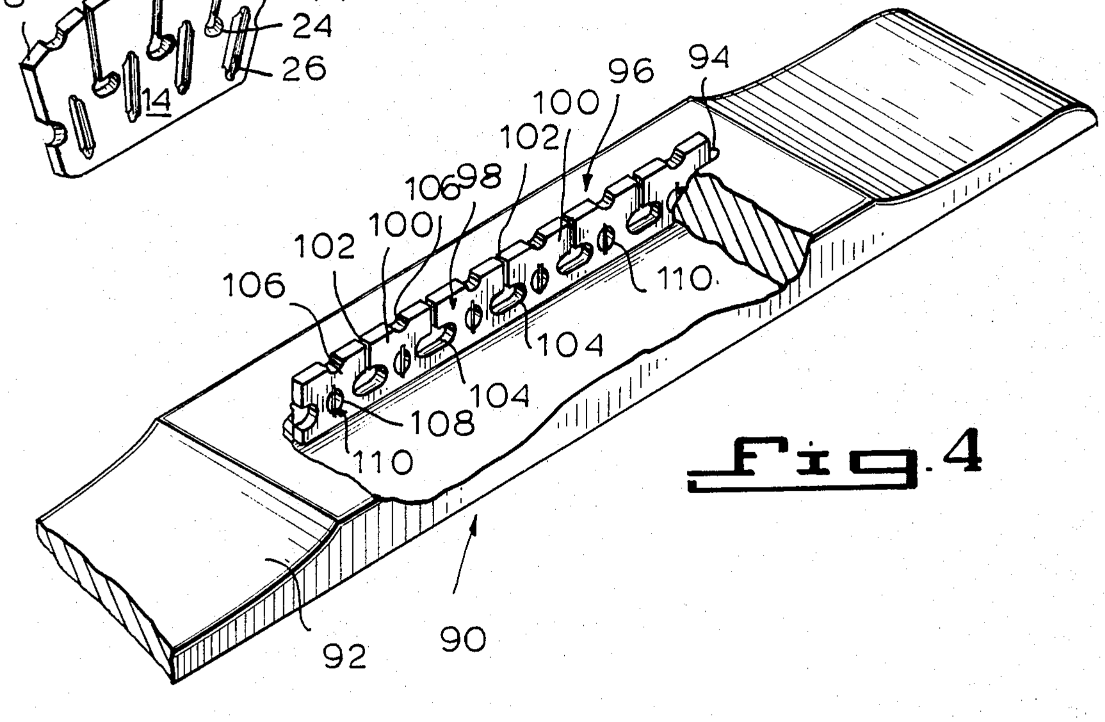
FIG. 4 is a perspective view of another embodient for a guitar bridge assembly.

FIG. 4 illustrates the present invention as applied to an acoustic guitar having a bridge assembly 90 comprising a saddle 92 having a slot 94 in which a multi-segmented transducer cartridge assembly 96 fits.

The piezo cartridge assembly 96 comprises an elongated rectangular bar shaped body 98 of bone or plastic material although wood material may be used. The bar 98 is divided, similarly, as in the first described embodiment, into a plurality of vibrating sections 100, (equal to the number of strings) by forming vertical slots 102, spaced along its length. The slots 102 terminate in a horizontally oriented hole 104, serving to separate and enhance the flexural response of each segment 100. The upper edge of each segment 100, is provided with groove means 106 in which the string is received. Below the groove 106 is a cavity 108 in which a piezo element assembly 110 is mounted in suspension, simultaneously to that shown and described in FIG. 2, having a parallel connection to the amplifier circuit. Copper shielding capsules, an insulating cover embodiment, and a copper shielding wall or shim may be used if desired, in the same manner as earlier described. Reference to FIG. 2 can be made for such details.

The embodiments of FIGS. 1, 2 and 4 are characterized by providing a segmented unitary cartridge consisting of mounting and clearance channels in a unitary base, for the suspension of the piezo elements. The unitary structure is then defined into independently flexural sections through a series of slots which isolate and focus the vibrational energy from an individual string, into the corresponding piezo element. Flexural response and mechanical isolation between segments is further enhanced through the openings at the base of the slots separating each of the transducer segments.

In the embodiment shown in FIG. 3, for a large instrument such as cello and bass, singular, separate cartridges can be installed in the form of inserts installed in machined channels in a standard bridge.

In all embodiments the functional principle is the same, each segment being independently flexurally responsive to an individual string through the free standing flexural portion of the structure which supports and engages the string. Each flexural segment has mechanical clearance the full length of the flexing portion which extends from the flex enhancing hole, the length of the slots, to the string support surface. This mechanical clearance is obtained through the use of shims or other means as described between the bridge structure, and the cartridge below the flex enhance hole. The shims also serve as electric contacts and EMI shielding plates.

This pickup system of the present invention is designed to employ to optimal advantage, a cantilever type mounting of "bimorph" piezo-electric elements. With such mounting, the piezo elements are each oriented so as to receive maximum flexural excitation from an individual string, with a high degree of isolation from its neighboring piezo and/or string coupled assemblies. By suspending the bimorph piezo elements vertically at their ends, between small mounting points within the highly flexural segments and stationary base, with the majority of the element's mass free standing, and with their modes of sensitivity in alignment with the segments lateral flexing action, the elements are free to respond unimpeded to the string/flexural segment interaction. This device provides an efficient mechanical coupling between the vibrating musical instrument string and its corresponding bimorph piezo-electric transducer element in a multi-stringed instrument.

The flexural segmented bimorph suspension system of the present invention does not engage the instrument body as a contact microphone. There is vibrational interaction with the instrument body and this is desired for tonal color. However, because the vibrations of each string are directly imparted to a corresponding largely free standing piezo element, the system inherently has a high degree of string to string signal isolation and a stronger electrical output string for string, because the bimorph piezo elements are not subjected to compressive restraint from downward string pressure.

Figure 5:
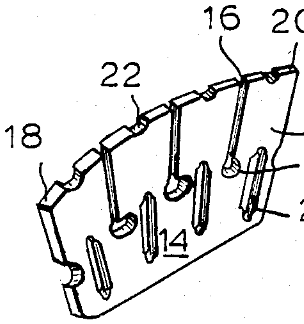
FIG. 5 is a perspective view of the cartridge depicted in FIG. 1 showing a further embodiment.

A further aspect of the present invention is illustrated in FIG. 5 and provides for a more accurate control and regulation of the vibrational forces driving the piezo elements by modifying or adjusting the wall thickness between the flex enhancing holes and piezo mounting channels in the flexural segments.

The bimorph piezo-electric transducer elements employed, are mechanically driven from their electroded sides which are sensitive in a laterally flexural mode and are thus mounted in alignment with the laterally flexural modes of their respective flexural segments. Thus vibrational stimuli and flexural compliance existing in the areas between the flex enhancing holes 24, and the mounting clearance cavities 26 are most critical in determining the response of the flexural segment and thereby the output of the transducer element coupled to it. Consequently, due to the independent flexural sensitivity of each of the segments within this system, and the variances of pressure and amplitude from the various tuned strings, (i.e: higher pitched strings - greater pressure and less amplitude), it is necessary to compensate the flexural response of certain of the segments in order to obtain a balanced overall output from all of the string/segment/piezo couplings. Also the outside segments on each end of the cartridge tend to vibrate more freely than the inside segments, thus producing an imbalanced response relative to the inside segments.

To obtain balance, it has been found that selective modification in size and/or shape of one or more of the small flex enhancing holes 24 (FIG. 1), notches 74 (FIG. 3) and holes 104 (FIG. 4) may be made.

It has been found that in general, the flex-enhancing holes 24, adjacent those sections carrying the smaller string S of the instrument should have a larger area than those flex-enhancing holes 24 adjacent the larger strings. Further, the central hole, or holes between interior vibrating segments may be larger in area than the holes relating to the smaller and larger strings carried by the exteriorly located vibrating segments.

Such modification is effective in the lateral direction and, when the hole or notch is enlarged on one side of the cavity (26, 82, 108) a corresponding increase in the cantilever action i.e., resonant action is realized on the piezo-element contained in the adjacent cavity. Thus, as seen for example in FIG. 5, when the flex enhancing holes 24 on the left side of the interior cavities 26 in the cartridge embodiment illustrated in FIG. 1, are provided with an enlarged area 120 on their right sides, an increased flexural bias on the left side of the bimorph piezo element to its right is obtained because the wall therebetween is thinner. If desired, selected flex enhancing holes may be enlarged on sides as shown in the oblong shapes illustrated in FIG. 4, which enlargements may themselves be equal or unequal in size.

Although less need is believed to exist for modifying the holes or notches at the extreme sides of the cartridge, due to their response relative to the interior segments, any one or more of the holes or notches arrayed in the cartridge and thus, flexural response of any segment can be selectively modified as required.

Various changes, modifications, as well as embodients, have been described herein. Others will be apparent to those skilled in this art. Accordingly, it is intended that the present disclosure be taken as illustrative and not as limiting of the scope of the invention.

What is claimed is:

1. An acoustic pick-up system for a stringed musical instrument comprising a bridge member and at least one transducer assembly mounted on said bridge member said transducer assembly comprising an integrally formed unitary body having an independently vibrating crown section and a non-vibrating base section, said crown section having an edge for receiving a string and a cavity below said edge, said transducer being suspended from opposite ends in said cavity between said crown section and said base section to produce an electric current in response to the vibration of said crown section corresponding to and representative of the vibration of said string and at least one hole formed between the crown section and the base section adjacent at least one side of said cavity to enhance vibration of said crown section wherein said hole or holes is/are formed at the bottom or base of an inwardly or downwardly disposed slot which eminates from the string receiving edge.

2. An acoustic pick-up system for a stringed musical instrument comprising a bridge member for placement on said instrument and a transducer cartridge assembly mounted thereon, said cartridge assembly comprising a unitary body divided by spaced slots forming at least one segment consisting of a vibrating section and a non-vibrating section, said vibrating section having an exposed edge for receiving a string, said at least one segment having a cavity below said edge, and a transducer mounted within said cavity between said vibrating and non-vibrating sections in alignment with said edge and flexurally responsive to vibration of said vibrating section by said string to produce an electric current, each of said slots terminally in an enlarged hole formed in said body, enhancing vibration of said vibrating section.

3. The acoustic pick-up system according to claim 2 wherein said cartridge body is divided by a plurality of spaced slots into a plurality of separate segments each supporting a string and having a transducer mounted in association with a corresponding string.

4. The acoustic pick-up system according to claim 2, wherein said transducer is an elongated piezo element, said element, having one end attached to said vibration section and its opposite end to said non-vibrating section.

5. The acoustic pick-up system according to claim 4, including means for electrically connecting said piezo-electric elements in parallel with each other.

6. The acoustic pick-up system according to claim 2 wherein said non-vibrating sections are integrally connected with each other.

7. The acoustic pick-up system according to claim 2 wherein said bridge member has front and rear faces and is provided with a recess in one face thereof into which said transducer cartridge assembly is seated, the other face of said bridge member forming the inner surface of said recess, and includes a shim arranged between said cartridge assembly and the inner surface of said recess to maintain said vibrating sections free of contact therewith.

8. The acoustic pick-up system according to claim 7 wherein said shim is formed of conductive electrically grounded material for Electro Magnetic Interference shielding.

9. The acoustic pick-up system according to claim 7 including an electrically grounded conductive shield mounted over said piezo element on the side opposite said shim.

10. The acoustic pick-up system according to claim 2 wherein said bridge member has front and rear faces and is provided with a recess in one face thereof into which said transducer cartridge assembly is seated, the other face of aid bridge member forming the inner surface of said recess, and includes a ledge arranged on the inner surface of said recess to maintain said vibrating sections free of contact therewith.

11. An acoustic pick-up system for a stringed instrument comprising a bridge member adapted to be located on said instrument and a plurality of transducer cartridges supported by said bridge member an spaced from each other in correspondence to the strings of said instrument, each of said transducer cartridges comprising a body having a pair of spaced side edges spaced from said forming a slot with said bridge member and defining a vibrating section formed with an upper edge supporting the corresponding string, non-vibrating section, and a cavity aligned with the string, a flexurally responsive elongated piezo-electric transducer mounted within said cavity having one end supported in contact with said vibrating section and one end supported in contact with said non-vibrating section, said piezo-electric transducer being responsive to the vibrations produced in said vibrating section by the corresponding string, said non-vibrating sections being formed with at least one hole in communication with at least one of said slots along said side edges to enhance vibration of said vibrating section.

12. The acoustic pick-up system according to claim 11, wherein each transducer cartridge is supported in a corresponding recess formed on one face of said bridge member, each of said recesses being spaced apart from each other and having interposed therebetween material of said bridge member.

13. The acoustic pick-up system according to claim 12, including a cover of conductive shielding material electrically grounded interposed between each transducer cartridge and the surface of said recess to shield one side of said transducer.

14. The acoustic pick-up system according to claim 13, including a grounded conductive shield mounted over the surface of said transducer on the side opposed to said cover.

15. The acoustic pick-up system according to claim 13, including means for electrically connecting said piezo-electric elements in parallel with each other.

16. The acoustic pick-up system according to claim 13, wherein said nonvibrating section of each transducer cartridge is adhesively coupled to the bridge member and thereby connected with each other.

17. An acoustic pick-up system for a stringed instrument comprising a bridge member adapted to be located on said instrument, and a transducer cartridge assembly comprising an elongated body in the shape of an elongated bar divided by a plurality of slots forming a plurality of vibrating sections, at least one of said slots terminating in a flex enhancing hole on at least one side of said vibrating sections each of said vibrating sections having an edge supporting a string and a non-vibrating section fixed to said bridge and a cavity aligned with the string in which is supported an elongated flexurally responsive piezo-electric transducer, said transducer being supported at one end in contact with the vibrating section and at the other end in contact with the non-vibrating section.

* * * * *

UNITED STATES PATENT AND TRADEMARK OFFICE

CERTIFICATE OF CORRECTION

PATENT NO. : 4,867,027

DATED : September 19, 1989

INVENTOR(S) : RICHARD BARBERA

It is certified that error appears in the above-identified patent and that said Letters Patent is hereby corrected as shown below:

Column 7, line 48 after "member" insert --,--

Column 8, line 50 "aid" should be --said--
line 57 "an" should be --and--
line 61 "said forming" should be --and forming--
line 63 before "non-vibrating" insert --a--

Signed and Sealed this

Sixteenth Day of October, 1990

*Attest:*

HARRY F. MANBECK, JR.

*Attesting Officer* *Commissioner of Patents and Trademarks*